No. 713,817. Patented Nov. 18, 1902.
J. R. TINNEY.
WINDMILL.
Application filed June 17, 1902.
(No Model.) 3 Sheets—Sheet 1.
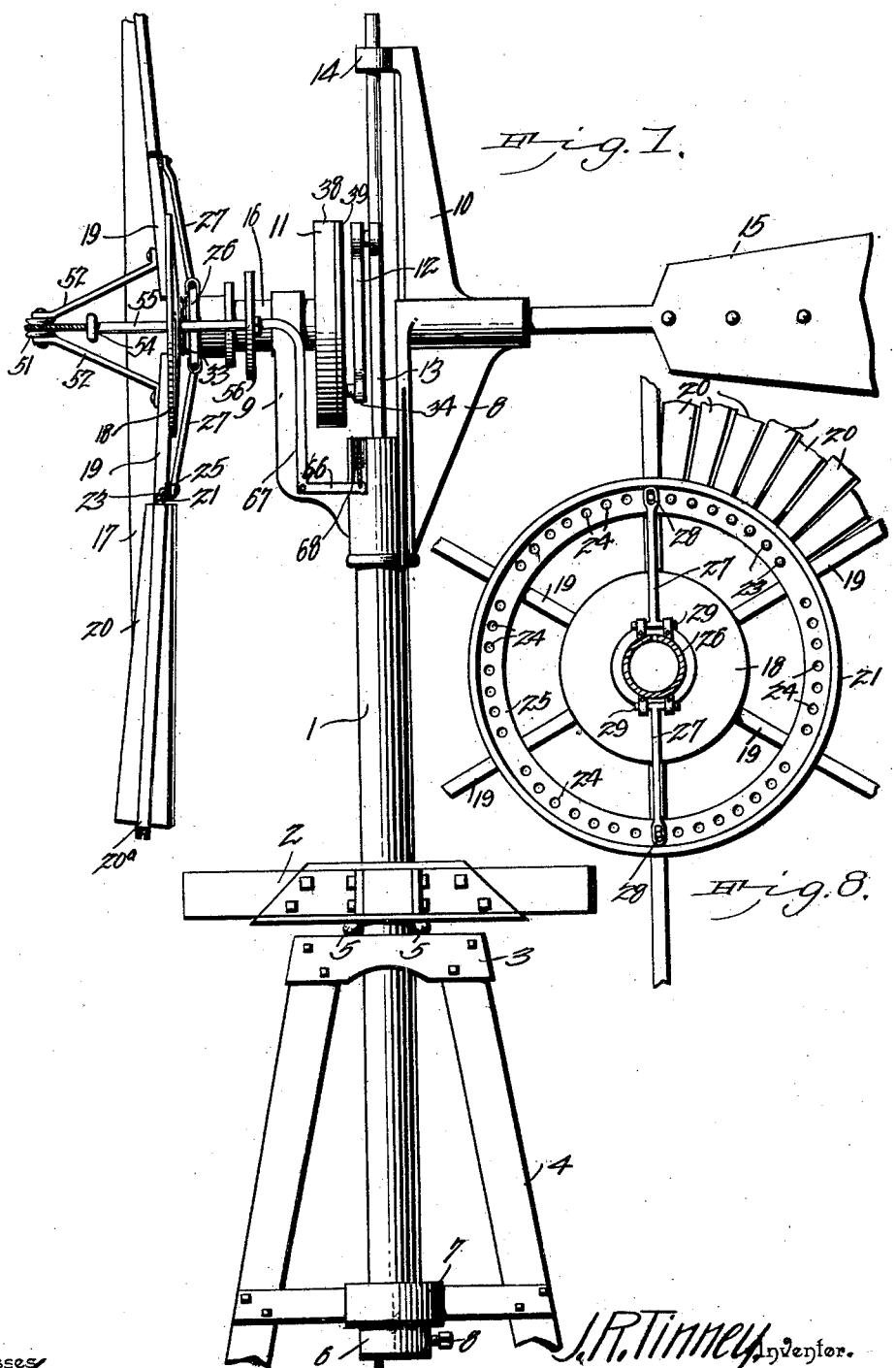

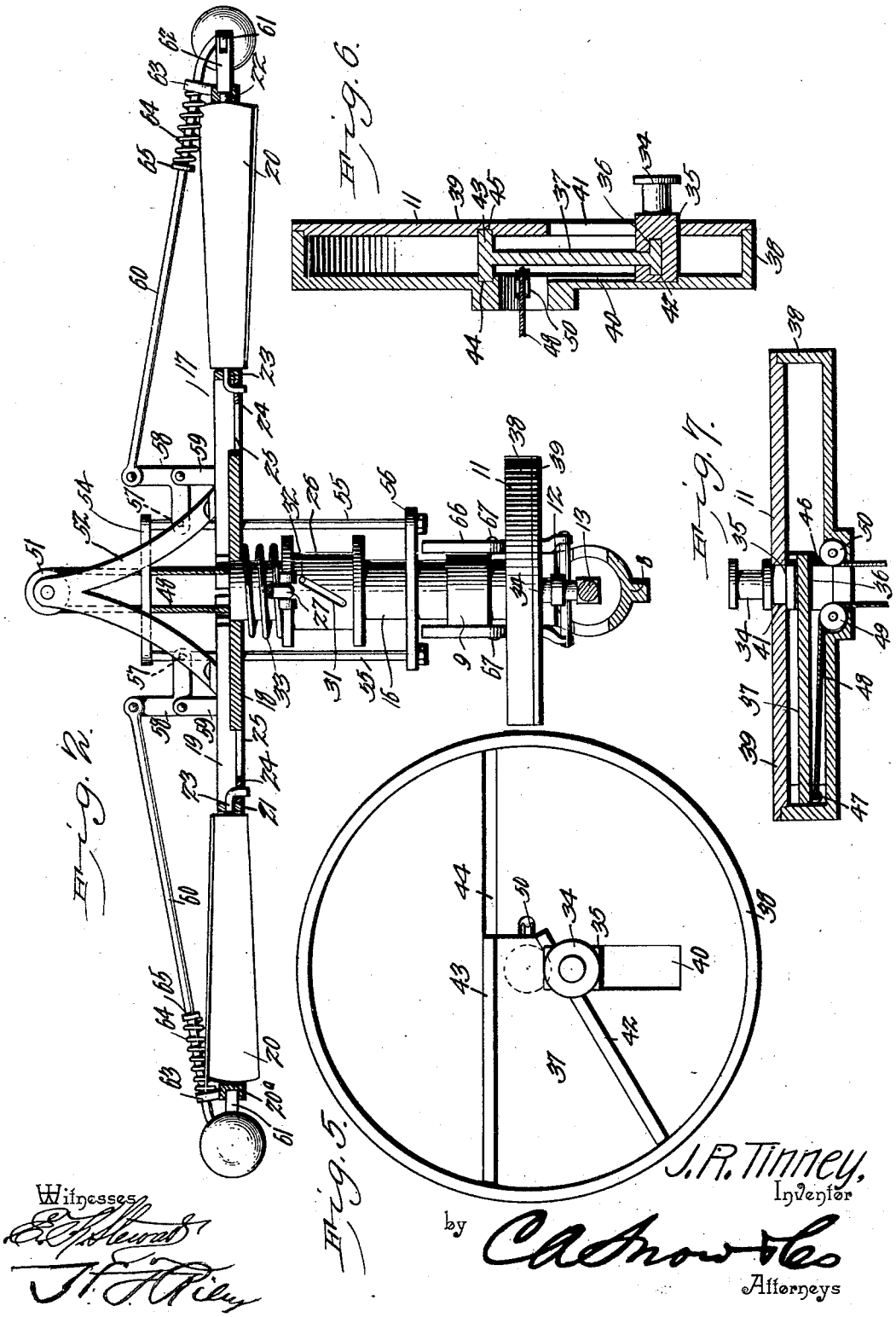

No. 713,817. Patented Nov. 18, 1902.
J. R. TINNEY.
WINDMILL.
(Application filed June 17, 1902.)
(No Model.) 3 Sheets—Sheet 3.
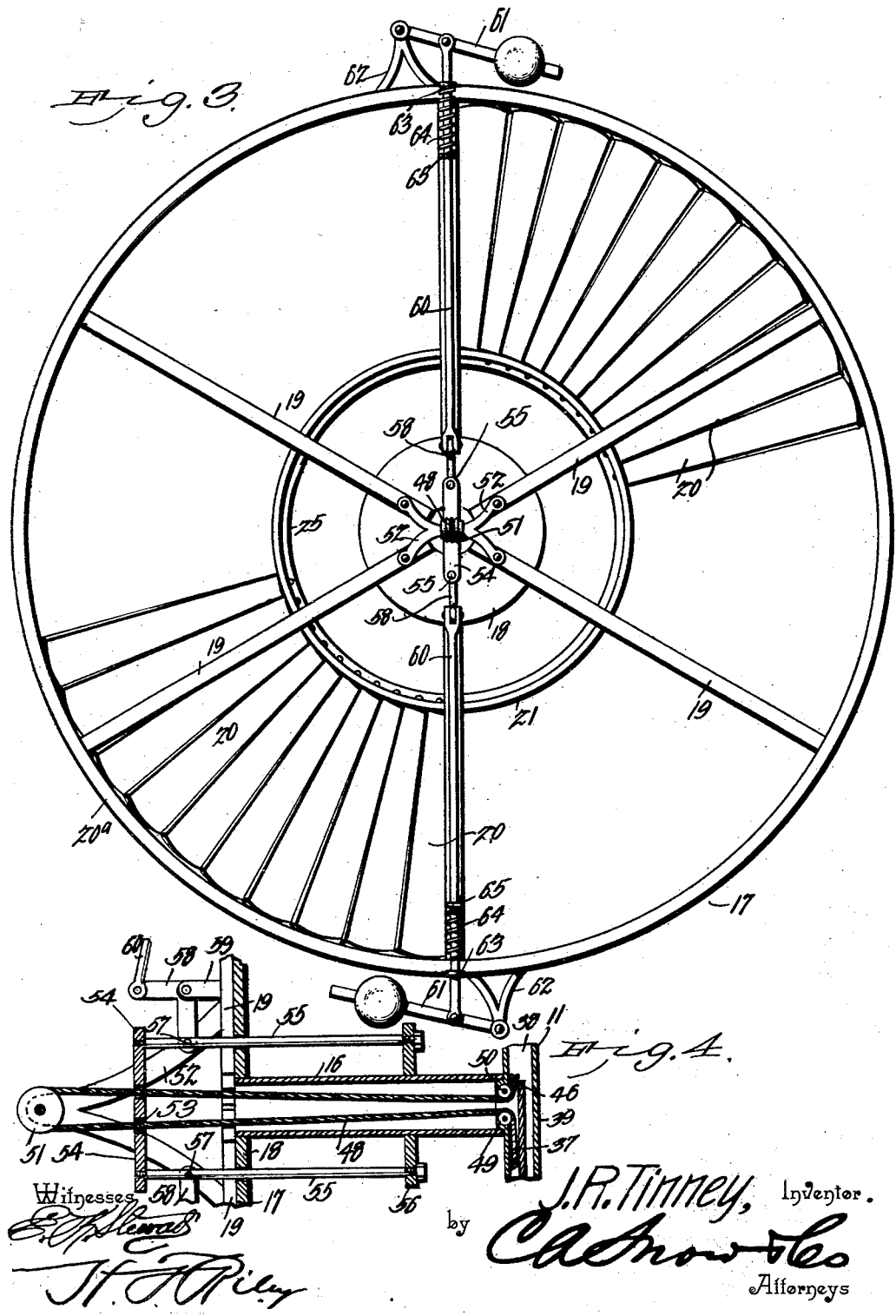

UNITED STATES PATENT OFFICE.

JAMES R. TINNEY, OF EL PASO, TEXAS.

WINDMILL.

SPECIFICATION forming part of Letters Patent No. 713,817, dated November 18, 1902.

Application filed June 17, 1902. Serial No. 112,089. (No model.)

*To all whom it may concern:*

Be it known that I, JAMES R. TINNEY, a citizen of the United States, residing at El Paso, in the county of El Paso and State of Texas, have invented a new and useful Windmill, of which the following is a specification.

The invention relates to improvements in windmills.

The object of the present invention is to improve the construction of windmills and to provide means for varying the stroke of a windmill with the velocity or force of the wind, to increase the length of the stroke as the velocity of the wind increases, and to reduce the length of stroke as the force of the wind abates, whereby windmills are enabled to operate more uniformly and to greater advantage and without injury in high winds of varying velocity.

A further object of the invention is to provide a construction of this character which will also be capable of controlling the fan-surface or blade-surface of the wind-wheel to reduce the exposed surface when the velocity of the wind increases beyond a predetermined point, whereby injury to the windmill will be effectually prevented.

The invention consists in the construction and novel combination and arrangement of parts hereinafter fully described, illustrated in the accompanying drawings, and pointed out in the claims hereto appended.

In the drawings, Figure 1 is a side elevation of a windmill constructed in accordance with this invention. Fig. 2 is a plan view partly in section. Fig. 3 is a side view of the wind-wheel. Fig. 4 is a horizontal sectional view taken through the shaft of the wind-wheel and illustrating the connection between the governor and the slidable wedge for controlling or varying the length of the stroke. Figs. 5, 6, and 7 are detail views of the crank-wheel, illustrating the manner of mounting the slidable wedge. Fig. 8 is a detail view of the central portion of the wind-wheel.

Like numerals of reference designate corresponding parts in all the figures of the drawings.

1 designates a vertically-disposed tubular shaft provided between its ends with a turn-table 2, located above a cap 3 of a tower 4 and preferably supported by antifriction-balls 5, but any other suitable antifriction devices may be employed for this purpose. The vertical tubular shaft is held against upward movement by means of a collar 6, arranged at its lower end beneath a suitable bearing 7 and provided with a clamping-screw 8 or other suitable device for securing it to the vertical shaft. The vertical shaft is provided at its upper end with a suitable bracket or frame 8, having upwardly-extending sides 9 and 10, which are spaced apart to receive a crank disk or wheel 11 and a pitman 12 for connecting the disk or wheel 11 with a pump-rod 13. The pump-rod is arranged between the sides or arms of the frame or bracket 8 and is extended through a top guide 14 of the side or arm 10, which projects above the other side or arm 9. The extended side 10 has a suitable vane 15 fixed to it, and the other side 9 is provided with a bearing for a horizontal tubular wind-wheel shaft 16, upon which is mounted the wind-wheel 17.

The wind-wheel 17 consists of a central disk 18, radial arms or spokes 19, and blades 20. The disk 18 forms the hub of the wheel and is suitably secured to the outer end of the tubular shaft 16, and the arms 19, which are secured at their inner ends to the disk 18, are connected by an outer rim 20$^a$ and an inner ring 21, located at the outer and inner ends of the blades.

The blades are provided at their outer and inner ends with pivots 22 and 23, and the inner pivots 23 are extended and bent at an angle to form arms, which are arranged in perforations 24 of a movable ring 25, which is adapted to be oscillated to partially rotate the blades to expose more or less of their surfaces to the wind. The movable ring is suitably mounted on the wind-wheel and is located within the inner ring, and it is connected with a sleeve 26 by means of links 27. The links 27 have their inner ends pivotally connected with the sleeve, and their outer ends have a limited longitudinal movement on the movable or oscillatory ring 25 to permit the sleeve 26 to slide longitudinally of the wind-wheel shaft. The outer ends of the links may be provided with slots 28 to permit this result, or any other suitable means may be employed for this purpose. The inner ends of the links are preferably provided with a pivot 29, which is arranged in suitable ears or bearings of the slidable sleeve. The slidable sleeve 26 is provided with a diagonal slot 31, receiving a pin or projection 32 of the horizontal wind-wheel shaft, whereby when the sleeve is moved longitudinally of the shaft it will also be partially rotated to open and close the blades. The sleeve is provided at its inner and outer ends with flanges, as shown, and a coiled spring 33 is interposed between it and the hub of the wind-wheel to hold the slidable sleeve normally at the limit of its movement to maintain the blades in their closed position. When the sleeve is moved inward by the means hereinafter described, the blades are open to lessen the surface presented to the wind to reduce the speed of the wind-wheel.

In order to increase the durability and efficiency of the windmill, the crank-disk is provided with an adjustable wrist-pin 34, capable of radial movement and adapted to vary the stroke of the windmill automatically with the velocity of the wind, so that when the force of the wind increases the length of the stroke of the pump-rod will be correspondingly increased and when the force of the wind abates the stroke of the pump-rod will be decreased. By this construction the operation of the parts to increase the work performed by the pump-rod with the increase of the force of the wind will prevent injury to the windmill by such variations in the force of the wind and will thereby increase the durability of the windmill and at the same time enable the same to operate more advantageously. The wrist-pin, which is connected with the lower end of the pitman, is provided with a shank 35, arranged in a radial way of the crank disk or wheel and provided with an approximately T-shaped slot or opening 36 to receive a slidable wedge 37. The crank disk or wheel is hollow, as illustrated in Figs. 5 and 6, being preferably composed of a back plate or body portion having an annular flange 38 and a removable front plate 39. The back plate or body portion of the disk or wheel is provided with a radial groove 40 to receive the inner end of the shank 35, and the outer removable plate 39 is provided with a slot 41, arranged opposite the groove 40 and receiving the outer portion of the shank. The slidable wedge is provided at its longitudinal edges with flanges 42 and 43, the flanges 42 being arranged in the approximately T-shaped slot or opening 36 of the shank of the wrist-pin and the other flanges 43 being arranged in a way formed by grooves 44 and 45 of the body portion of the disk or wheel and the removable plate 49. The outer flanges 42, which are interlocked with the shank of the wrist-pin, are arranged at an angle to the inner flanges 43, and it will be apparent that the wrist-pin will be moved inward and outward when the sliding wedge is reciprocated. The flanges project from both of the faces of the wedge, as clearly shown in Fig. 6, and they are firmly interlocked with the crank disk or wheel and the shank of the wrist-pin.

The inner and outer ends of the wedge are connected with the ends 46 and 47 of a cable 48 or other flexible connection, which passes over a pair of guide-pulleys 49 and 50 and extends through the tubular wind-wheel shaft to a guide-pulley 51. The guide-pulleys 49 and 50, which are mounted on the crank disk or wheel, are located at the inner end of the tubular wind-wheel shaft, and the outer guide-pulley 51 is supported by a pair of brackets 52 and is located at a point opposite the outer end of the horizontal wind-wheel shaft. The brackets 52, which are approximately V-shaped, are secured to the arms or spokes of the wind-wheel and are provided with suitable bearings or perforations for the pivot or spindle of the guide-pulley 51. By this arrangement it will be seen that the sliding wedge will be moved across the crank disk or wheel when the cable is actuated.

One of the sides or flights of the longitudinal portion of the cable is connected at a point beyond the wind-wheel at 53 with a cross bar or head 54, which connects the outer end of a pair of reciprocating rods 55. The rods 55, which extend from the cross bar or head 54 through the wind-wheel, are connected at their inner ends with a flange or plate 56, which is loosely mounted on the wind-wheel shaft. The reciprocatory rods 55 are pivoted near their outer ends by pins 57 or other suitable fastening devices to arms of bell-crank lever 58, which are fulcrumed at their angles on suitable supports 59 of the wind-wheel and which are connected with governor-rods 60. A pair of centrifugal governors is employed, and each governor consists of a weighted lever 61, fulcrumed on a bracket or support 62 of the wind-wheel, and is connected between its ends with the outer end of the governor-rod 60. The rod 60 passes through a guide 63 of the rim of the wind-wheel and is engaged by a coiled spring 64, disposed on the rod and interposed between the guide 63 and a collar or flange 65 and adapted to assist in maintaining the blades closed and in normally holding the levers in the position shown in Fig. 3. In order for the governors to effect the opening of the blades, the force of the wind must be sufficient to overcome the springs 64 and the spring 33. When the force of the wind increases sufficiently to throw the weighted arms of the levers 61 outward, the radially-disposed arms of the bell-crank levers will be oscillated and the cable will be actuated to increase the length of the stroke of the pump-rod, and the length of the stroke of the pump-rod will be automatically varied to adjust it to the force of the wind. Should, however, the force of the wind increase beyond a predetermined degree and be dangerous to the windmill, the reciprocatory rods will be carried outward sufficiently to engage the flange 56 with the slidable sleeve and open the blades of the wind-wheel and expose less fan-surface to the wind and maintain a uniform speed. Should the force of the wind suddenly increase, the governor will be operated by the increased speed of the wind-wheel to reduce the fan-surface exposed to the wind and will lessen the speed of the wind-wheel. In this manner the windmill is adapted to operate at a uniform speed during storms and high winds. The windmill is automatic in its operation of controlling the stroke of the pump-rod to adapt the work to be performed to the power of the wind.

Any suitable means may be employed for enabling the windmill to be stopped from the base of the tower, and this operation may be readily effected by means of a lever 66, of bell-crank form, fulcrumed at its angle at 67 on the bracket or frame and connected with an operating rod or wire or other suitable connection. One arm of the bell-crank lever is arranged in an upright position and the other arm extends horizontally, and the operating-wire or other connection is provided with a flexible portion passing over a pulley 68 and adapted when the operating cord or wire is pulled to throw the horizontal arm upward and thereby move the flange 56 outward on the wind-wheel shaft. This movement will slide the sleeve inward toward the wind-wheel and thereby compress the spring 33 and open the blades.

It will be seen that the windmill is exceedingly simple and inexpensive in construction, that it is positive, reliable, and automatic in its operation, and that it is capable of varying the length of the stroke of the pump-rod to the force of the wind, so that as the force of the wind increases the stroke will be lengthened and as it decreases the stroke will be shortened.

What I claim is—

1. In a windmill the combination with a wind-wheel, a crank element provided with a pivotal pin, a wedge for moving the pivot inward and outward to vary the length of the stroke, and means for automatically operating the wedge as the wind varies in force, substantially as described.

2. In a windmill, the combination of a wind-wheel, a crank disk or wheel connected with the wind-wheel and provided with a wrist-pin slidably mounted on it, a wedge mounted on the crank disk or wheel and connected with the wrist-pin and adapted to move the same inward and outward, and means for automatically operating the wedge to vary the length of the stroke with the intensity of the wind, substantially as described.

3. In a windmill, the combination of a wind-wheel, a crank disk or wheel, a wrist-pin slidably mounted on the crank disk or wheel and adapted to move inward and outward to vary the length of the stroke, a sliding wedge interlocked with the wrist-pin and arranged in a suitable way of the disk or wheel, and means for automatically reciprocating the wedge to vary the length of the stroke with the intensity of the wind, substantially as described.

4. In a windmill, the combination of a wind-wheel, a crank disk or wheel provided with a movable wrist-pin, a slidable wedge connected with the wrist-pin and mounted on the crank disk or wheel, a flexible connection extending from the wedge and arranged on suitable guides, and a governor carried by the wind-wheel and connected with the flexible connection, substantially as described.

5. In a windmill, the combination of a wind-wheel, a crank disk or wheel provided with a movable wrist-pin, a sliding wedge carried by the disk or wheel and connected with the wrist-pin, a flexible connection extending from the wedge, a slidable element connected with the flexible connection, and a governor for operating the slidable element, substantially as described.

6. In a windmill, the combination of a wind-wheel, a hollow wind-wheel shaft, a crank disk or wheel having a movable wrist-pin, a slidable wedge connected with the wrist-pin and adapted to actuate the same, a flexible connection extending from the wedge through the wind-wheel shaft to the exterior of the wind-wheel, and a governor mounted on the wind-wheel and connected with the flexible connection, substantially as described.

7. In a windmill, the combination of a wind-wheel, a hollow wind-wheel shaft, a crank disk or wheel having a movable wrist-pin, a wedge arranged to actuate the wrist-pin, guide-pulleys arranged at the inner end of the wind-wheel shaft, an outer guide-pulley located beyond the wind-wheel, a flexible connection arranged on the guide-pulleys and connected with the wedge, and a governor carried by the wind-wheel and connected with the flexible connection, substantially as described.

8. In a windmill, the combination of a wind-wheel, a crank disk or wheel composed of a body portion having a groove 40 and provided with a groove 44 arranged at an angle to the groove 40, a wrist-pin guided in the groove 40, and a face-plate connected with the body of the disk or wheel and provided with a slot to receive the wrist-pin and having a groove 43 arranged opposite the groove 44, a wedge engaging the wrist-pin and provided with flanges arranged in the grooves 43 and 44, and a governor mounted on the wind-wheel and connected with the wedge, substantially as described.

9. In a windmill, the combination of a wind-wheel, a hollow wind-wheel shaft, a crank disk or wheel provided with a movable wrist-pin, a wedge for actuating the wrist-pin, a sliding frame mounted on the wind-wheel shaft and connected with the wedge, and a governor carried by the wind-wheel and connected with the sliding frame, substantially as described.

10. In a windmill, the combination of a wind-wheel, a crank disk or wheel provided with a movable wrist-pin, a wind-wheel shaft, a sliding frame mounted on the wind-wheel shaft and connected with the movable wrist-pin, and a governor carried by the wind-wheel and connected with the sliding frame, substantially as described.

11. In a windmill, the combination of a wind-wheel, a wind-wheel shaft, a crank disk or wheel having a movable wrist-pin, a sliding wedge connected with the wrist-pin, a slidable frame mounted on the wind-wheel shaft, connections between the sliding frame and the wedge, and a governor mounted on the wind-wheel for actuating the sliding frame, substantially as described.

12. In a windmill, the combination of a wind-wheel, a wind-wheel shaft, a crank disk or wheel provided with an adjustable wrist-pin, a slidable frame connected with the wrist-pin and adapted to actuate the same, levers fulcrumed on the wind-wheel and connected with the slidable frame, and governors carried by the wind-wheel and connected with the levers, substantially as described.

13. In a windmill, the combination of a wind-wheel, a hollow wind-wheel shaft, a crank disk or wheel having a movable wrist-pin, a flexible connection extending through the shaft and connected with the wrist-pin, a slidable frame composed of rods, a cross-head connecting the outer ends of the rods and connected with the said flexible connection and a sliding plate or flange connected with the inner ends of the rods, levers fulcrumed on the wind-wheel and connected with the rods, and governors connected with the levers, substantially as described.

14. In a windmill, the combination of a wind-wheel having pivoted blades, a crank element connected with the wind-wheel, and means for automatically adjusting the crank element to vary the length of the stroke with the intensity of the wind and for automatically opening and closing the blades of the wind-wheel, substantially as described.

15. In a windmill, the combination of a wind-wheel having pivoted blades, a wind-wheel shaft, a sliding sleeve mounted on the shaft and connected with the pivoted blades, a sliding frame arranged to engage the sliding sleeve, a governor mounted on the wheel and connected with the sliding frame, and a movable crank element connected with the sliding frame, substantially as described.

16. In a windmill, the combination of a wind-wheel having pivoted blades, a wind-wheel shaft, a sliding sleeve connected with the pivoted blades and having a diagonal opening, a projection mounted on the shaft and arranged in the diagonal opening of the sleeve, a spring engaging the sleeve, a sliding frame arranged to engage the sleeve, an adjustable crank element connected with the sliding frame, and a governor carried by the wind-wheel for actuating the sliding frame, substantially as described.

17. In a windmill, the combination of a wind-wheel having pivoted blades, an oscillatory ring connected with the blades, a wind-wheel shaft, a sliding spring-actuated sleeve having a limited rotary movement and mounted on the shaft, said sleeve being also connected with the blades, a sliding frame composed of side rods and inner and outer connecting portions and arranged to engage the sleeve, levers mounted on the wheel and connected with the said rods, governors connected with the levers, and an adjustable wrist-pin connected with the sliding frame, substantially as described.

18. In a windmill, the combination of a wind-wheel having pivoted blades, an adjustable wrist-pin, a sliding frame connected with the wrist-pin, a lever arranged to engage the sliding frame, means connected with the lever for enabling the same to be operated from the base of the tower, substantially as described.

In testimony that I claim the foregoing as my own I have hereto affixed my signature in the presence of two witnesses.

JAMES R. TINNEY.

Witnesses:
SEYMOUR THURMOND,
S. N. RUSSELL.